US007007109B2

(12) United States Patent
Sivertsen

(10) Patent No.: US 7,007,109 B2
(45) Date of Patent: Feb. 28, 2006

(54) METHOD AND APPARATUS FOR SUSPENDING COMMUNICATION WITH A HARD DISK DRIVE IN ORDER TO TRANSFER DATA RELATING TO THE HARD DISK DRIVE

(75) Inventor: Clas Sivertsen, Lilburn, GA (US)

(73) Assignee: American Megatrends, Inc., Norcross, GA (US)

( * ) Notice: Subject to any disclaimer, the term of this patent is extended or adjusted under 35 U.S.C. 154(b) by 380 days.

(21) Appl. No.: 09/944,797

(22) Filed: Aug. 31, 2001

(65) Prior Publication Data

US 2003/0046471 A1 Mar. 6, 2003

(51) Int. Cl.
*G06F 3/00* (2006.01)

(52) U.S. Cl. .......................................... 710/15; 710/306

(58) Field of Classification Search ......... 710/300–304, 710/305, 306, 311, 313–315, 104, 75, 19
See application file for complete search history.

(56) References Cited

U.S. PATENT DOCUMENTS

| | | | | |
|---|---|---|---|---|
| 5,313,626 A | | 5/1994 | Jones et al. | 714/5 |
| 5,317,697 A | | 5/1994 | Husak et al. | 710/302 |
| 5,666,497 A | | 9/1997 | Milhaupt et al. | 710/305 |
| 5,787,246 A | * | 7/1998 | Lichtman et al. | 709/220 |
| 5,815,647 A | | 9/1998 | Buckland et al. | 714/3 |
| 5,822,782 A | | 10/1998 | Humlicek et al. | 711/170 |
| 5,867,733 A | | 2/1999 | Meyer | |
| 5,898,891 A | | 4/1999 | Meyer | |
| 5,920,709 A | | 7/1999 | Hartung et al. | 710/305 |
| 6,038,624 A | * | 3/2000 | Chan et al. | 710/302 |
| 6,145,029 A | * | 11/2000 | Deschepper et al. | 710/36 |
| 6,594,721 B1 | * | 7/2003 | Sakarda et al. | 710/304 |
| 6,639,792 B1 | | 10/2003 | Chang | 361/685 |
| 6,654,843 B1 | | 11/2003 | Wakeley et al. | 710/302 |
| 6,742,068 B1 | | 5/2004 | Gallagher et al. | 710/302 |
| 6,743,054 B1 | | 6/2004 | Wu | 439/638 |

OTHER PUBLICATIONS

Conner Peripherals, Inc. and Intel Corporation, *SCSI Accessed Fault–Tolerant Enclosures Interface Specification*, Revision 1.00, Oct. 17, 1995.

David Landis and William Check, "An Analysis of Queuing Strategies for SCA Data Broadcast Systems," 1988, The Pennsylvania State University, IEEE Transactions On Broadcasting, vol. 34, No. 1, Mar., 1998.

* cited by examiner

*Primary Examiner*—Mark H. Rinehart
*Assistant Examiner*—Clifford Knoll
(74) *Attorney, Agent, or Firm*—The Hope Law Firm, LLC.

(57) ABSTRACT

Methods and apparatus are provided for suspending communications with a hard disk drive in order to transfer data relating to the hard disk drive between the host and an intermediate communications gateway, thereby isolating the hard disk drive from the bus while this data is transferred. The data transferred between the host and the intermediate communications gateway may include control signals transferred from the host to the intermediate communications gateway and status signals transferred from the intermediate communications gateway to the host. In one embodiment, normal communications with an IDE hard disk drive are suspended upon the assertion of the RESET line of the AT bus. As such, the state of the RESET line may be controlled such that the RESET line is no longer merely utilized as a system reset but, instead, is used to define the state of communications between the host and the hard disk drive.

26 Claims, 3 Drawing Sheets

METHOD AND APPARATUS FOR SUSPENDING COMMUNICATION WITH A HARD DISK DRIVE IN ORDER TO TRANSFER DATA RELATING TO THE HARD DISK DRIVE

FIELD OF THE INVENTION

The present invention relates generally to methods and apparatus for suspending communication with a hard disk drive in order to transfer data relating to the hard disk drive and, more particularly, methods and apparatus for isolating a hard disk drive from the bus in order to transfer status and/or control signals relating to the hard disk drive.

BACKGROUND OF THE PRESENT INVENTION

A variety of intelligent hard disk drives have been developed, such as intelligent drive electronics (IDE) hard disk drives, small computer systems interface (SCSI) hard disk drives and fiber channel (FC) hard disk drives. In addition to the hard disk and associated drive electronics, an intelligent hard disk drive includes an integral controller designed specifically for the particular type of hard disk drive in order to control its operation.

In a computer, such as a personal computer, a hard disk drive is connected to the central processing unit by means of the system bus. In this regard, conventional computer architectures have a motherboard that includes a central processing unit and the system bus to which various peripherals, including a hard disk drive, are connected. To support the connection of the various peripherals, including a hard disk drive, to the system bus, a motherboard also generally includes a number of bus slots. A hard disk drive is typically connected to a respective bus slot by means of another bus designed specifically to support communications between the system bus and the hard disk drive. With respect to an IDE hard disk drive, for example, the IDE hard disk drive is connected to the respective bus slot by means of an advanced technology (AT) bus. An AT bus is a flat cable having 40 lines, each designed to support communication of a predetermined type of signal. For example, an AT bus includes a number of address lines, data lines, chip select lines, a reset line and others.

Although an intelligent hard disk drive includes an integral controller, most computers also include another controller disposed between the system bus and the bus extending to the hard disk drive for directing communications with the hard disk drive. In one embodiment depicted in FIGS. 1 and 3, this controller 8 is mounted upon the motherboard 10 so as to be in communication with both the system bus and the hard disk drive 12. For example, a portion of the bus that extends to the hard disk drive may extend from the controller to a connector 14 that is also mounted upon the motherboard. This bus may be completed by an appropriate cable 16 having connectors on the opposed ends for connection, at a first end, with the connector mounted upon the motherboard and, at the other end, to a connector carried by the hard disk drive. As such, communication between the hard disk drive, the central processing unit and other components of the computer system is supported by the transfer of signals between the controller onboard the motherboard and the hard disk drive.

In other configurations such as that depicted in FIG. 2, the controller is not mounted upon the motherboard 10, but is, instead, mounted upon a separate printed circuit board, termed the host controller board 18, designed to connect, typically by means of an edge connector, with one of the bus slots so as to communicate with the system bus. The host controller board includes the controller as well as related electronics. As described above in conjunction with the configuration in which the controller is mounted upon the motherboard, a portion of the bus that extends to the hard disk drive is also carried by this additional board and extends from the controller to a connector 20 mounted upon the host controller board. Again, a cable 16 having appropriate connectors on the opposed ends is mated at one end to the connector carried by the host controller board and, at the other end, to a connector carried by the hard disk drive 12 in order to establish communications therebetween. In either configuration in which the controller 8 is mounted upon the motherboard or the host controller board, the controller and its associated electronics are typically termed the host and are designed to communicate directly with the hard disk drive as shown schematically in FIG. 3.

Of the intelligent hard disk drives, SCSI hard disk drives and FC hard disk drives are designed and specified to be hot swappable. In this regard, SCSI and FC hard disk drives may be removed, inserted and/or exchanged while the computer is operating and power is supplied to the various peripherals, including other disk drives. In contrast, IDE hard disk drives have not traditionally been hot swappable. Instead, IDE hard disk drives have historically only been able to be removed, inserted or otherwise exchanged while the computer was shut down or powered off. In addition, SCSI and FC hard disk drives are designed to provide various status signals indicative of, among other things, the operational state of the hard disk drive to the host. Unfortunately, IDE hard disk drives do not include provisions for transmitting similar status signals to the host.

For various reasons, SCSI hard disk drives are typically utilized by mid-range and high-end computers and FC hard disk drives are used nearly exclusively in high-end computers. In contrast, IDE hard disk drives are not generally included in higher-end systems. Even though IDE hard disk drives are traditionally utilized in low-end systems, it would still be advantageous for the IDE hard disk drives to be hot swappable and to be capable of providing status or other signals to the host. In order to at least partially address these concerns, some IDE hard disk drives have recently been developed that are hot swappable. These recent IDE hard disk drives include a backplane positioned between the host and the hard disk drive that carries appropriate electronics to permit the hard disk drive to be removed and another hard disk drive to be inserted while the computer continues to provide power to and communicate with other peripherals, including other disk drives. Unfortunately, IDE hard disk drives have not yet been developed that are capable of providing status information to the host.

SUMMARY OF THE INVENTION

Methods and apparatus are therefore provided for suspending communication with a hard disk drive in order to transfer data relating to the hard disk drive, such as status signals, to a host. In one advantageous embodiment, the hard disk drive is an IDE hard disk drive. According to this embodiment of the present invention, the IDE hard disk drive can transfer data, including various status signals, to the host and the host can likewise transfer data, such as control signals, to the IDE hard disk drive. Thus, the methods and apparatus of the present invention significantly improve communication between the host and the hard disk drive.

The apparatus of the present invention includes a bus, such as an AT bus, having a plurality of lines including at least one control line, such as the RESET line. In addition to the control line, the bus also generally includes chip select, address and data lines. The bus is disposed in communication with the hard disk drive. The apparatus of the present invention also includes a host for directing communications via the bus with the hard disk drive. The host controls the state of the control line such that communication with the hard disk drive is supported while the control line is in a first state, such as in instances in which the RESET line is deasserted. Conversely, the host controls the state of the control line such that communication with the hard disk drive is suspended while the control line is in a second state, such as in instances in which the RESET line is asserted. The apparatus of the present invention further includes an intermediate communications gateway disposed between the bus and the hard disk drive. The intermediate communications gateway is responsive to the state of the control line in order to permit communication between the host and the hard disk drive while the control line is in the first state and to isolate the hard disk drive from the bus while the control line is in the second state.

According to the present invention, the host and the intermediate communications gateway cooperate to communicate data relating to the hard disk drive via the bus while the control line is in the second state. In this regard, the host and the intermediate communications gateway may communicate data relating to the hard disk drive via at least one of the chip select, address and data lines while the control line is in the second state. The host and the intermediate communications gateway may communicate various types of data relating to the hard disk drive in either one or both directions while the control line is in the second state. For example, the host may provide control signals to the intermediate communications gateway via the bus while the control line is in the second state. The control signals may include power control signals, alarm signals, a reset signal and visual indicator signals. The intermediate communications gateway may, in turn, subsequently provide instructions to the hard disk drive in accordance with the control signals since the intermediate communications gateway maintains local communications with the hard disk drive even though the hard disk drive is isolated from the bus while the control line is in the second state in accordance with the present invention. Moreover, the intermediate communications gateway typically continues to supply power to the hard disk drive while the control line is in the second state and the hard disk drive is isolated from the bus. The communication may also flow in the opposite direction with the intermediate communications gateway providing status signals to the host via the bus while the control line is in the second state. Typically, the status signals are provided in response to a query from the host regarding the status of the hard disk drive. The intermediate communications gateway may provide various status signals including a drive presence signal, a failure signal, an alarm signal, a visual indicator status signal, a temperature signal and an operational state signal.

In operation, communication is permitted between the host and the hard disk drive via the bus while the control line is in the first state. If a transition of the control line from the first state to the second state is detected, however, the hard disk drive is isolated from the bus so long as the control line remains in the second state. Data relating to the hard disk drive, such as control signals or status signals, may then be communicated via the bus between the intermediate communications gateway and the host while the control line is in the second state and the hard disk drive is isolated from the bus.

Therefore, the methods and apparatus of the present invention permit data relating to a hard disk drive, such as an IDE hard disk drive, to be transferred via the bus while the computer is operational and powered up. For example, control signals can be directed from the host to an intermediate communications gateway associated with the hard disk drive for subsequent transfer to the hard disk drive and, conversely, status signals can be obtained by the host from the intermediate communications gateway associated with the hard disk drive. As a result, the host can better control and utilize the hard disk drive. Moreover, the capabilities afforded by the methods and apparatus of the present invention permit a hard disk drive, such as an IDE hard disk drive, that is generally utilized in lower-end computers to enjoy some of the additional features traditionally only provided by the hard disk drives in higher-end computers, such as SCSI and FC hard disk drives.

BRIEF DESCRIPTION OF THE DRAWINGS

Figure 1:
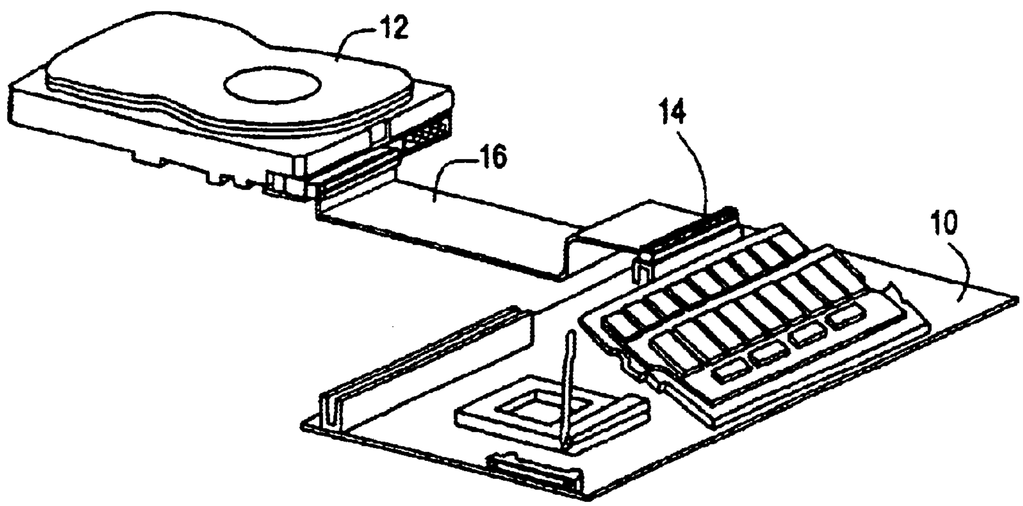
Figure 2:
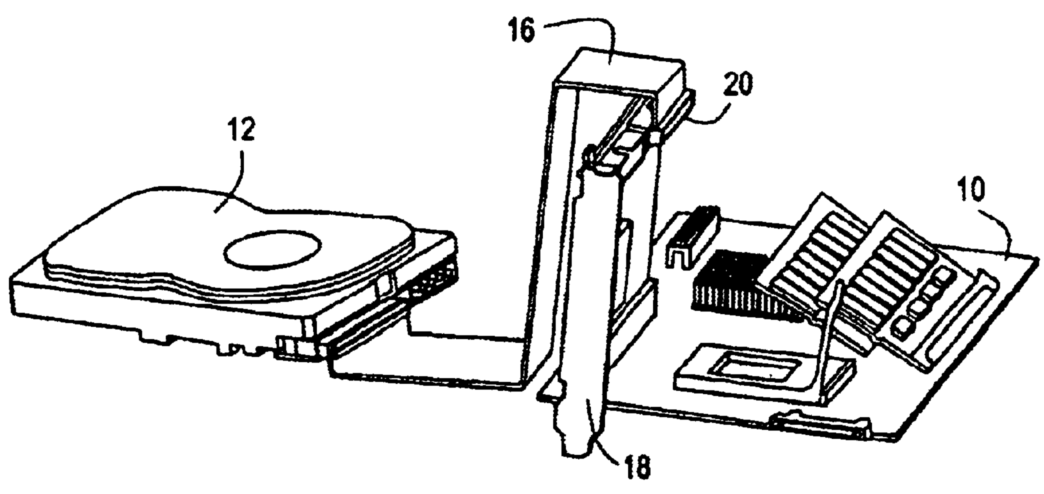
Figure 3:
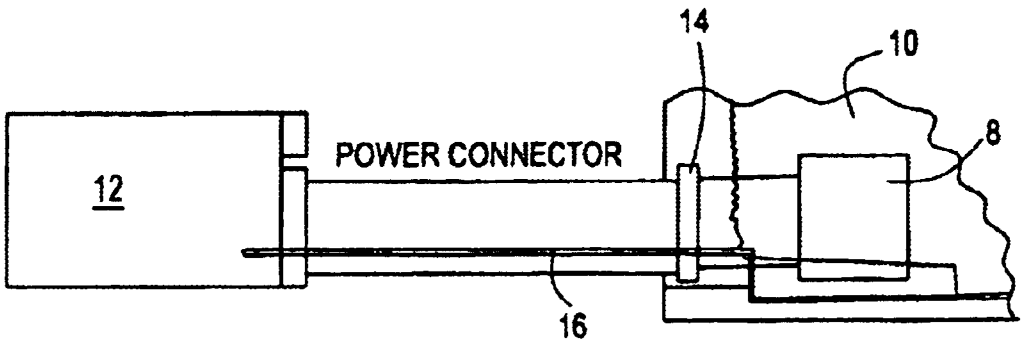
Figure 4:
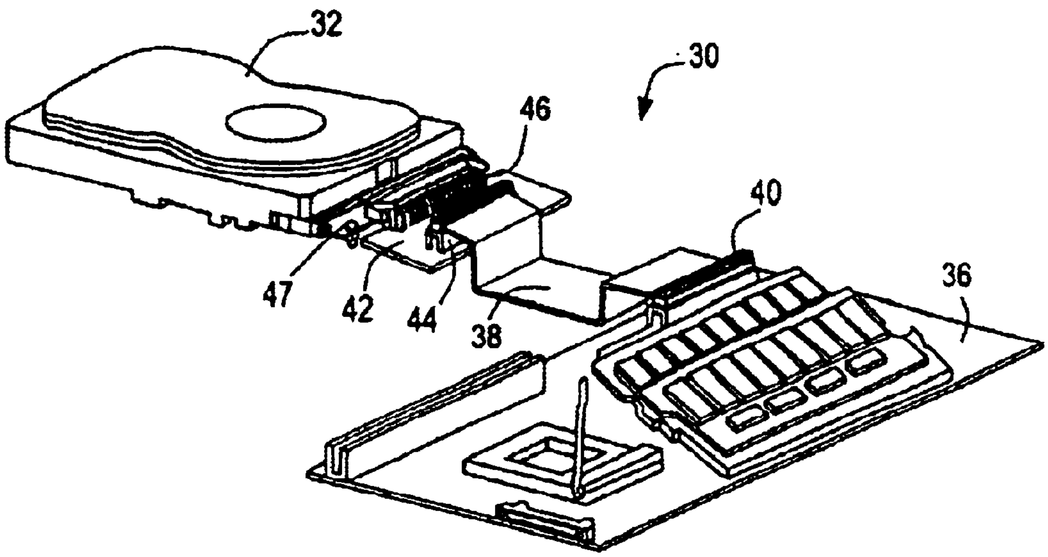
Figure 5:
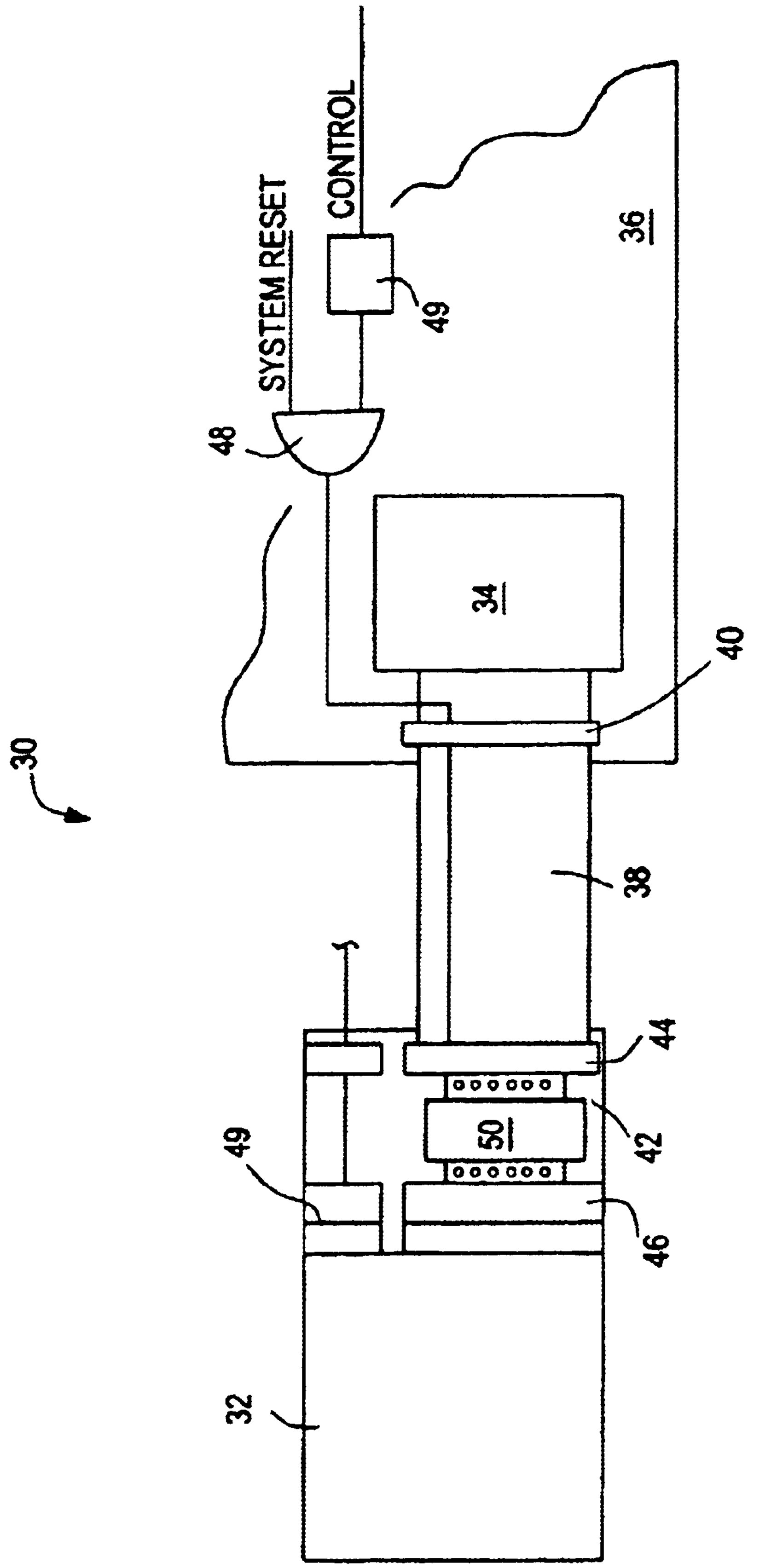

Having thus described the invention in general terms, reference will now be made to the accompanying drawings, which are not necessarily drawn to scale, and wherein:

FIG. 1 is a perspective view of a conventional motherboard and an associated IDE hard disk drive;

FIG. 2 is a perspective view of a conventional motherboard, a host controller board and an associated IDE hard disk drive;

FIG. 3 is a schematic representation of the conventional computer systems depicted in FIGS. 1 and 2;

FIG. 4 is a perspective view of one advantageous embodiment of an apparatus according to the present invention; and FIG. 5 is a schematic representation of the apparatus of FIG. 4 illustrating the electrical connection thereof.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Referring now to FIGS. 4 and 5, an apparatus 30 according to one advantageous embodiment of the present invention is depicted. Typically, the apparatus is embodied by a personal computer. It should be understood, however, that the apparatus may also be embodied in a wide variety of other computer systems.

The apparatus 30 includes a host for communicating with a hard disk drive 32. The host generally includes a controller 34 for directing communications with the hard disk drive. As shown in FIG. 4, the controller may be mounted upon a motherboard 36 such that the entire motherboard is referred to as the host. In this embodiment, the controller is typically connected to a central processing unit onboard the motherboard via a system bus. Alternatively, the controller may be mounted upon a separate printed circuit board, i.e., a host controller board, that, in turn, is electrically and physically connected to the motherboard. In this regard, the motherboard may include an expansion or bus slot and the host controller board may include an edge connector for mating with the expansion slot. As a result of its mating engagement with the expansion slot, the controller is again connected to the system bus and, in turn, the central processing unit of the motherboard for communication therewith. In this embodiment, the host controller board including the controller and the associated electronics is typically termed the host controller. Throughout this application, however, both embodiments will be generically referenced as the host.

The type of controller 34 utilized by the apparatus 30 of the present invention will generally be selected based upon the type of hard disk drive 32. For an IDE hard disk drive, for example, the controller is typically an IDE controller, such as the MegaRaid IDE100 controller provided by American Megatrends Inc. of Atlanta, Ga.

The apparatus 30 of the present invention also includes a bus 38 extending from the host toward the hard disk drive 32. As shown in FIG. 4, the bus generally includes a cable having a plurality of lines and connectors mounted upon the opposed ends. The connector mounted upon one end of the cable electrically and mechanically engages a corresponding connector 40 mounted upon either the motherboard 36 or the host controller board depending upon the configuration of the host. In addition to the cable, the bus may include a bus segment that extends between the controller 34 and the connector to which the cable is mated. In this regard, the bus segment generally extends along either the motherboard or the host controller board depending upon the configuration of the host. Thus, the controller is connected to and may direct communications via the bus.

Like the controller 34, the apparatus 30 may include various types of buses 38 depending upon the type of hard disk drive 32. For an IDE hard disk drive, for example, the apparatus includes an AT bus. As known to those skilled in the art, an AT bus includes 40 lines, each of which is assigned to carry a predetermined type of signal. For example, the AT bus includes a number of address lines, a number of data lines, several chip select lines, a RESET line and others. While the AT bus may be physically embodied in various manners, the AT bus is typically a flat computer cable having appropriate connectors mounted upon the opposed ends and mated at one end with the connector 40 mounted upon the motherboard 36 or the host controller board depending upon the configuration of the host so as to establish communications with the controller.

Unlike conventional IDE hard disk drives, however, the other end of the AT bus 38 of this embodiment of the present invention is not directly connected to the hard disk drive 32. Instead, the apparatus 30 of the present invention also includes an intermediate communications gateway 42. The intermediate communications gateway is disposed between the bus and the hard disk drive. Although the intermediate communications gateway may be embodied in a number of different manners, the intermediate communications gateway of one embodiment includes a backplane having a first connector 44 for mating with the connector carried by the second end of the bus. The backplane also includes a second connector 46 for establishing electrical connection with the hard disk drive. The intermediate communications gateway can establish electrical connection with the hard disk drive in a wide variety of manners including direct connection to the connector carried by hard disk drive, connection to the hard disk drive via an adapter 47 as shown in FIG. 4 or via another cable or bus, if so desired. In any event, the intermediate communications gateway is designed to communicate with the host via the bus and to separately or locally communicate with the hard disk drive.

In normal operation, the host transmits instructions via the bus 38 so as to read data from the hard disk drive 32 or write data to the hard disk drive. With respect to a read operation, the controller 34 transmits an instruction via the bus to the intermediate communications gateway 42 indicating that data is to be read and defining the location of or otherwise identifying the data to be read. The intermediate communications gateway relays this instruction to the hard disk drive which, in turn, responds by providing the requested data to the intermediate communications gateway for transmission to the host via the bus. Conversely, in order to write data to the hard disk drive, the controller transmits an instruction indicating that data is to be written to the hard disk drive along with the actual data to be written. The intermediate communications gateway receives the instruction as well as the data to be written and relays the instruction along with the data to the hard disk drive which, in turn, appropriately stores the data.

According to the present invention, however, communication via the bus 38 with the hard disk drive 32 as described above may be suspended in order to transfer data via the bus relating to the hard disk drive. As such, the method and apparatus 30 of the present invention define two different states of communication between the host and the intermediate communications gateway 42, namely, a normal state in which data is transmitted between the hard disk drive and the host as described above and isolation state in which communication with the hard disk drive is suspended and the hard disk drive is isolated from the bus. In order to define the state of communication between the host and the intermediate communications gateway, the host can control the state of at least one control line of the bus such that communication with the hard disk drive is supported while the control line is in a first state and communication with the hard disk drive is suspended while the control line is in a second state. While various lines of the bus may be utilized as the control line depending upon the type of hard disk drive and, correspondingly, the predefined functions of the various lines of the bus, the control line is preferably a line of the bus that may be accessed and controlled by the host.

With respect to one advantageous embodiment of the present invention in which the hard disk drive 32 is an IDE hard disk drive and the bus 38 is correspondingly an AT bus, the RESET line is preferably utilized as the control line for purposes of defining the state of communication between the host and the hard disk drive since the RESET line is conventionally driven by the system reset signal that is accessible, such as by the central processing unit and the other peripheral devices connected to the peripheral component interconnect (PCI) bus as well as by the operator as a result of manual actuation of a reset button, while the remainder of the lines of the AT bus originate with the controller 34 and would therefore be more difficult to access. Typically, the RESET line of the AT bus is utilized by the host in order to reset the hard disk drive, such as during the initial application of power or during or following a failure, a hang or a time out condition.

Various techniques may be utilized in order to access and drive the reset line to define and control the state of communications between the host and the IDE hard disk drive 32. In one embodiment provided by means of example but not of limitation, the system reset signal is no longer directly connected to the reset line of the AT bus 38. Instead, the system reset signal is combined with a control signal. The control signal may be provided in various manners, but, in one embodiment, is provided by a general purpose input/output register, such as one of the registers of a conventional PCI bridge. The control signal may be provided to the general purpose input/output register from various sources depending upon the design, including the central processing unit, the basic input output system (BIOS), the operating system or a system designer, in order to define the state of communications between the host and the hard disk drive. In the illustrated embodiment, for example, the control signal and the system reset signal are combined by an AND gate 48, with the output of the AND gate driving the reset line of the AT bus. While the relative states of the system reset line may vary based upon the signaling convention of the computer, the system reset signal is typically maintained high since the system reset signal is high under normal conditions in which the hard disk drive is not to be reset and low only in instances in which the hard disk drive is to be reset. Thus, in normal conditions in which the system reset signal is high the state of the control line will dictate the output of the ANT) gate 48. In this regard, while the first and second states of the control line, i.e., the reset line, may also be defined differently depending upon the signaling convention utilized by the computer, the host of one embodiment drives the control line and, in turn, the reset line high in order to maintain normal communications between the host and the hard disk drive and low in order to suspend communications with the hard disk drive and to isolate the hard disk drive from the bus. While one embodiment of a technique for controlling the reset line of the AT bus is depicted in FIG. 5, other techniques may be utilized.

The intermediate communications gateway 42 includes a logic circuit, a processing element, such as a processor, or other electronics 50 for monitoring the state of the control line and, in the above-described embodiment, permits communication between the host and the hard disk drive 32 while the control line is high, but isolates the hard disk drive from the bus 38 while the control line is low. In this regard, while the control line is high, the intermediate communications gateway transfers instructions and data received via the bus from the host to the hard disk drive and, conversely, transfers data received from the hard disk drive to the host via the bus. Upon detecting that the control line has transitioned from the first state to the second state, such as by detecting a high to low transition in the above-described embodiment, however, the intermediate communications gateway prevents the host from communicating with the hard disk drive by isolating the hard disk drive from the bus. However, the intermediate communications gateway does still support local communications between the intermediate communications gateway and the hard disk drive while the hard disk drive is isolated from the bus. In addition, the intermediate communications gateway continues to provide power received from the computer power supply to the hard disk drive while the hard disk drive is isolated from the bus, via a power connection 49.

While the hard disk drive 32 is isolated from the bus 38, the host and the intermediate communications gateway 42 can communicate data relating to the hard disk drive via the bus. The host and the intermediate communications gateway communicate a wide variety of data. This data may be transmitted via any line of the bus other than the line(s) utilized for control. Typically, however, the chip select, address and data lines of the bus are utilized for the transmission of data relating to the hard disk drive between the host and the intermediate communications gateway. By way of one example of the type of data relating to the hard disk drive that may be communicated between the host and the intermediate communications gateway, the host may provide control signals to the intermediate communications gateway directing some activity on the part of the hard disk drive. In this example, the intermediate communications gateway receives the control signals from the host and, in turn, provides appropriate instructions to the hard disk drive via the local communications link maintained therebetween. While the host can transmit various types of control signals, examples of the control signals include power control signals for enabling power to the hard disk drive, alarm signals for indicating a drive failure and visual indicator signals directing the hard disk drive to provide visual indicators indicating failure, presence and/or activity. In addition to the transmission of control signals from the host to the intermediate communications gateway, the intermediate communications gateway can provide status signals to the host while the hard disk drive is isolated from the bus. Typically, the status signals are provided in response to a query from the host regarding the status of the hard disk drive. In this regard, the status signals can include the drive present signal indicating the presence or absence of a hard disk drive, a failure signal indicating if the hard disk drive has experienced a failure, an alarm signal indicating if the hard disk drive has failed that will typically generate an audible alert, a visual indicator status signal indicating if the hard disk drive is currently providing a visual indication of either failure or activity, a temperature signal indicating the temperature of the air surrounding the hard disk drive and an operational state signal indicating the current operational state of the hard disk drive.

While the intermediate communications gateway 42 may be configured in a number of different manners, the intermediate communications gateway typically includes a plurality of registers for storing status information relating to the hard disk drive 32. The status information includes, among other status conditions, the drive presence status, the failure status, the alarm status, the visual indicator status, the temperature status and the operational state status. As such, in response to a query from the host, the intermediate communications gateway may provide the requested status by polling the contents of the appropriate register and transmitting the contents of the appropriate register to the host via the bus. Additionally, the intermediate communications gateway can include registers for storing the control signals received from the host. As such, the intermediate communications gateway can subsequently provide appropriate instructions to the hard disk drive in accordance with the control signals transmitted by the host based upon the contents of the registers of the intermediate communications gateway.

Regardless of the particular manner of implementation, the method and apparatus 30 of the present invention permit the host to issue various commands to the hard disk drive 32 and to obtain a variety of status information relating to the hard disk drive while the computer, as a whole, remains operational and powered on and in a manner not previously possible, particularly for IDE hard disk drives.

Upon completion of the communication relating to the hard disk drive 32 between the host and the intermediate communications gateway 42, the host can again transition the state of the control line from the second state, such as the low state, to the first state, such as a high state, in order to cause the RESET line of the AT bus to also transition to the low state, thereby permitting normal communications between the host and the hard disk drive to recommence as described above. This process can be repeated as many times and at whatever frequency is desired in order to permit the host to provide appropriate control signals to the immediate communications gateway and, in turn, to the hard disk drive and to permit the host to obtain the necessary status information relating to the hard disk drive.

Even in embodiments in which the RESET line of the bus 38, such as the AT bus, is utilized as the control line, the method and apparatus 30 of the present invention still support resetting of the hard disk drive 32. Since the RESET line is utilized to define and control the state of communications between the host and the intermediate communications gateway 42, however, the host can take advantage of the state of communications between the host and the intermediate communications gateway in the event that the system reset is asserted, such as by being driven low. In this regard, the assertion of the system reset signal will also drive the output of the AND gate 48 and, in turn, the RESET line of the AT bus low, thereby isolating the hard disk drive from the bus. While the hard disk drive is isolated from the bus, the host can issue a control signal via the other lines of the bus indicating that the hard disk drive is to be reset. Upon receipt of the control signal from the host indicating that the hard disk drive is to be reset, the intermediate communications gateway can transmit an appropriate reset signal to the hard disk drive via the local communications link maintained between the intermediate communications gateway and the hard disk drive, thereby resetting the hard disk drive.

Therefore, the methods and apparatus 30 of the present invention permit data relating to a hard disk drive 32, such as an IDE hard disk drive, to be transferred via the bus 38 while the computer remains operational and powered up. For example, control signals can be directed from the host to an intermediate communications gateway 42 associated with the hard disk drive for subsequent transfer to the hard disk drive and, conversely, status signals associated with the hard disk drive can be obtained by the host from the intermediate communications gateway. As a result, the host can better control and utilize the hard disk drive. Moreover, the capabilities afforded by the methods and apparatus of the present invention permit a hard disk drive, such as an IDE hard disk drive, that is generally utilized in lower-end computers to enjoy some of the additional features traditionally only provided by the hard disk drives in higher-end computers, such as SCSI and FC hard disk drives.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus for suspending communication with a hard disk drive in order to transfer data relating to the hard disk drive, the apparatus comprising:

a bus having a plurality of lines including at least one control line, said bus disposed in communication with the hard disk drive;

a host for directing communications via said bus with the hard disk drive, said host controlling a state of the at least one control line such that communication with the hard disk drive is supported while the at least one control line is in a first state and communication with the hard disk drive is suspended while the at least one control line is in a second state; and an intermediate communications gateway disposed between said bus and the hard disk drive, said intermediate communications gateway being responsive to the state of the at least one control line in order to permit communication between said host and the hard disk drive while the at least one control line is in the first state and to isolate the hard disk drive from said bus while the at least one control line is in the second state, wherein said host and said intermediate communications gateway cooperate to communicate data relating to the hard disk drive via said bus while the at least one control line is in the second state and wherein the intermediate communications gateway establishes communication with the hard disk drive to retrieve the data relating to the hard disk drive for communication via said bus while the at least one control line is in the second state and while the hard disk drive is isolated from said bus.

2. An apparatus according to claim 1 wherein said bus also includes chip select, address and data lines, and wherein said host and said intermediate communications gateway communicate data relating to the hard disk drive via at least one of the chip select, address and data lines while the at least one control line is in the second state.

3. An apparatus according to claim 1 wherein said host provides control signals to said intermediate communications gateway via said bus while the at least one control line is in the second state such that said intermediate communications gateway is capable of subsequently providing instructions to the hard disk drive in accordance with the control signals.

4. An apparatus according to claim 3 wherein said host provides control signals selected from the group consisting of power control signals, alarm signals, a reset signal and visual indicator signals.

5. An apparatus according to claim 1 wherein said intermediate communications gateway provides status signals to said host via said bus while the at least one control line is in the second state in response to a query from said host regarding status of the hard disk drive.

6. An apparatus according to claim 5 wherein said intermediate communications gateway provides status signals selected from the group consisting of a drive presence signal, a failure signal, an alarm signal, a visual indicator status signal, a temperature signal and an operational state signal.

7. An apparatus according to claim 1 wherein said intermediate communications gateway supports local communication with the hard disk drive while the at least one control line is in the second state and the hard disk drive is isolated from said bus.

8. An apparatus according to claim 1 wherein said intermediate communications gateway continues to supply power to the hard disk drive while the at least one control line is in the second state and the hard disk drive is isolated from said bus.

9. An apparatus according to claim 1 wherein said bus is an AT bus disposed in communication with an IDE hard disk drive, and wherein the at least one control line of said AT bus is the RESET line.

10. An apparatus comprising:

an AT bus having a plurality of lines including a RESET line an IDE hard disk drive capable of communicating via said AT bus;

a host for communicating via said AT bus with said IDE hard disk drive, said host capable of alternately asserting and deasserting the RESET line; and an intermediate communications gateway disposed between said AT bus and said IDE hard disk drive, said intermediate communications gateway being responsive to the RESET line in order to permit communication between said host and said IDE hard disk drive while the RESET line is deasserted and to isolate said IDE hard disk drive from said AT bus while the RESET line is asserted, wherein said host and said intermediate communications gateway cooperate to communicate data relating to said IDE hard disk drive via said AT bus while the RESET line is asserted and wherein the intermediate communications gateway establishes communication with the hard disk drive to retrieve the data relating to the IDE hard disk drive for communication via said bus while the RESET line is asserted and while the IDE hard disk drive is isolated from said bus.

11. An apparatus according to claim 10 wherein said AT bus also includes chip select, address and data lines, and wherein said host and said intermediate communications gateway communicate data relating to said IDE hard disk drive via at least one of the chip select, address and data lines while the RESET line is asserted.

12. An apparatus according to claim 10 wherein said host provides control signals to said intermediate communications gateway via said AT bus while the RESET line is asserted such that said intermediate communications gateway is capable of subsequently providing instructions to said IDE hard disk drive in accordance with the control signals.

13. An apparatus according to claim 12 wherein said host provides control signals selected from the group consisting of power control signals, alarm signals, a reset signal and visual indicator signals.

14. An apparatus according to claim 10 wherein said intermediate communications gateway provides status signals to said host via said AT bus while the RESET line is asserted in response to a query from said host regarding status of said IDE hard disk drive.

15. An apparatus according to claim 14 wherein said intermediate communications gateway provides status signals selected from the group consisting of a drive presence signal, a failure signal, an alarm signal, a visual indicator status signal, a temperature signal and an operational state signal.

16. An apparatus according to claim 10 wherein said intermediate communications gateway supports local communication with said IDE hard disk drive while the RESET line is asserted and said IDE hard disk drive is isolated from said AT bus.

17. An apparatus according to claim 10 wherein said intermediate communications gateway continues to supply power to said IDE hard disk drive while the RESET line is asserted and said IDE hard disk drive is isolated from said AT bus.

18. A method of suspending communication with a hard disk drive in order to transfer data relating to the hard disk drive, the method comprising:

permitting communications between a host and the hard disk drive via a bus while at least one control line of the bus is in a first state;

detecting a transition of the at least one control line from the first state to a second state;

isolating the hard disk drive from the bus following detection of the transition and while the at least one control line remains in the second state; and communicating data relating to the hard disk drive via the bus between an intermediate communications gateway and the host while the at least one control line is in the second state and the hard disk drive is isolated from the bus and wherein the intermediate communications gateway establishes communication with the hard disk drive to retrieve the data relating to the hard disk drive for communication via said bus while the at least one control line is in the second state and while the hard disk drive is isolated from said bus.

19. A method according to claim 18 wherein the bus also includes chip select, address and data lines, and wherein communicating data while the hard disk drive is isolated from the bus comprises communicating data relating to the hard disk drive between the host and the intermediate communications gateway via at least one of the chip select, address and data lines.

20. A method according to claim 18 wherein communicating data while the hard disk drive is isolated from the bus comprises providing control signals from the host to the intermediate communications gateway via the bus, and wherein the method further comprises subsequently providing instructions from the intermediate communications gateway to the hard disk drive in accordance with the control signals.

21. A method according to claim 20 wherein providing control signals comprises providing control signals selected from the group consisting of power control signals, alarm signals, a reset signal and visual indicator signals.

22. A method according to claim 20 wherein communicating data while the hard disk drive is isolated from the bus comprises providing status signals from the intermediate communications gateway to the host via the bus in response to a query from the host regarding status of the hard disk drive.

23. A method according to claim 22 wherein providing status signals comprises providing status signals selected from the group consisting of a drive presence signal, a failure signal, an alarm signal, a visual indicator status signal, a temperature signal and an operational state signal.

24. A method according to claim 18 further comprising supporting local communications between the intermediate communications gateway and the hard disk drive while the at least one control line is in the second state and the hard disk drive is isolated from the bus.

25. A method according to claim 18 further comprising continuing to supply power to the hard disk drive while the at least one control line is in the second state and the hard disk drive is isolated from the bus.

26. A method according to claim 18 wherein the bus is an AT bus and the hard disk drive is an IDE hard disk drive, and wherein detecting the transition comprises detecting the transition of the RESET line of the AT bus from the first state in which the RESET line is unasserted to the second state in which the RESET line is asserted.

* * * * *